United States Patent
Miki et al.

(10) Patent No.: US 7,419,306 B2
(45) Date of Patent: Sep. 2, 2008

(54) BEARING UNIT FOR RAILWAY CARRIAGES

(75) Inventors: Daisuke Miki, Mie-ken (JP); Shiro Ishikawa, Mie-ken (JP)

(73) Assignee: NTN Corporation, Osaka (JP)

( * ) Notice: Subject to any disclaimer, the term of this patent is extended or adjusted under 35 U.S.C. 154(b) by 7 days.

(21) Appl. No.: 11/124,376

(22) Filed: May 9, 2005

(65) Prior Publication Data

US 2006/0039640 A1 Feb. 23, 2006

(30) Foreign Application Priority Data

May 24, 2004 (JP) ............................ 2004-153905

(51) Int. Cl.
*F16C 33/78* (2006.01)
*F16C 33/60* (2006.01)

(52) U.S. Cl. .................. 384/477; 384/551; 384/571

(58) Field of Classification Search ................ 384/476, 384/477, 486, 459, 571, 551; 295/36.1, 38, 295/42.1
See application file for complete search history.

(56) References Cited

U.S. PATENT DOCUMENTS

| | | | |
|---|---|---|---|
| 3,041,901 A | 6/1962 | Bayerl | |
| 4,692,040 A * | 9/1987 | Ebaugh et al. | 384/484 |
| 4,997,294 A | 3/1991 | Hillmann | |
| 5,118,206 A * | 6/1992 | Otto et al. | 384/477 |
| 5,492,419 A * | 2/1996 | Miller et al. | 384/551 |
| 6,126,321 A * | 10/2000 | Fetty et al. | 384/459 |
| 6,561,559 B1 | 5/2003 | Skiller et al. | |

FOREIGN PATENT DOCUMENTS

| | | | |
|---|---|---|---|
| JP | 2001027254 A | * | 1/2001 |
| JP | 2001354136 A | * | 12/2001 |
| JP | 2003-049856 A | | 2/2003 |

* cited by examiner

*Primary Examiner*—Thomas R Hannon
(74) *Attorney, Agent, or Firm*—Arent Fox LLP

(57) ABSTRACT

Emergence of fretting worn powder is to be suppressed, and intrusion of the worn powder that has emerged into an internal area of the bearing. A ring spacer is interposed between an end face of an inner ring of the bearing to be mounted on a wheel axle, and an end face of a rear cover (ring member) to be mounted on the wheel axle for axial positioning of the inner race with respect to the wheel axle. An elastic seal ring is integrally fixed to an outer periphery of the ring spacer. The elastic seal ring is elastically fitted to an outer circumference of a recessed stepped portion formed on the end face of the rear cover. The elastic seal ring is thus pressed against the opposing end faces of the inner race and the rear cover. Inside the elastic seal ring, a storage space for the worn powder is provided.

8 Claims, 5 Drawing Sheets

BEARING UNIT FOR RAILWAY CARRIAGES

BACKGROUND OF THE INVENTION

1. Field of the Invention

The present invention relates to a bearing unit for supporting a wheel axle of a railway carriage via a roller bearing.

2. Description of the Related Art

A bearing unit for a railway carriage wheel axle is generally provided with a roller bearing to be mounted on the wheel axle, and a pair (front and rear) of ring members mounted on the wheel axle for axial positioning of an inner race of the roller bearing. One of the ring members serves as a rear cover butted to rear end face of the inner race, and the other as an oil thrower butted to a front end face thereof, or as a rear cover and a front cover butted to the respective end faces thereof, and both are constituted of a heat-treated carbon steel.

FIG. 5 is a cross-sectional view of an ordinary bearing unit for a railway carriage wheel axle. The bearing unit includes a pair of ring members, namely a rear cover 11 and an oil thrower 12 at the respective end portions of an inner race 3 of a roller bearing 2 mounted on a wheel axle 1. The roller bearing 2 is for example a double-race tapered roller bearing, and includes a split type inner race 3, a one-piece outer race 4, rollers 5 aligned in two rows between the inner race 3 and the outer race 4, and a retainer 6 for the rollers. The rear cover 11 is first insert-fitted to the wheel axle 1, then the roller bearing 2 is mounted and finally the oil thrower 12 is insert-fitted. The oil thrower 12 is pressed against the front end face of the inner race 3, and thereby pressing the rear end face against the front end face of the rear cover 11, thus delimiting an axial position of the inner race 3 with respect to the wheel axle 1. On the respective outer circumferential surface of the rear cover 11 and the oil thrower 12 an oil seal 14, 14 is disposed in sliding-contact therewith, and each oil seal 14, 14 is attached to a seal case 15, 15 extended from a front and rear end portions of the outer race 4.

With respect to such a bearing unit, an excessive radial load, which is characteristic to railway carriages, imposed on the wheel axle 1 applies an excessive bending moment thereto, thus repeatedly applying a stress to a contact interface X between the inner race 3 and the rear cover 11, as well as to a contact interface Y between the inner race 3 and the oil thrower 12. As a result, fretting (wear) is incurred on the contact interfaces X, Y, which produces minute worn powder of the carbon steel. Such fretting wear is inevitable to railway carriages since the wheel axle 1 suffers an excessive radial load, and when the fretting progresses further the positioning accuracy of the bearing unit 2 is degraded, which incurs intrusion of the worn powder into an internal area of the bearing unit 2, and hence deterioration of a lubricant provided therein, thus resulting in shortening a life span of the bearing unit 2.

As an example of a remedy to prevent emergence of such worn powder from fretting, JP-A Laid Open No.2001-027254 discloses a bearing unit provided with a spacer (plate) of a soft material, interposed between the inner race and the ring member such as the rear cover. FIG. 6 depicts a spacer 32 constituted of a soft metal plate or a resin plate interposed at the contact interface X between the inner race 3 and the rear cover 11, so as to keep the inner race 3 and the rear cover 11 from directly colliding with each other, thus to prevent the fretting wear. The spacer is to be replaced when worn out, to thereby prolong a life span of the bearing unit.

Another solution is proposed by JP-A Laid Open No.2001-354136, which provides a bearing unit that prevents intrusion of the worn powder produced by wear due to the direct contact of the inner race and the ring member, into an internal area of the bearing. FIG. 7 depicts an elastic member 33 such as a rubber ring elastically pressed to an outer circumferential surface of the contact interface X between the inner race 3 and the rear cover 11, to prevent leakage of the worn powder from the contact interface X. In this case, the outer circumferential surface of the contact interface is constituted of those of the inner race 3 and the rear cover 11 processed to have a same outer diameter, and butted to each other. The elastic member 33 is firmly pressed against such outer circumferential surface, so as to seal the contact interface X both liquid-tightly and air-tightly, thus to prevent leakage of the worn powder to the bearing unit 2.

The bearing unit for a railway carriage wheel axle shown in FIG. 6 is effective in that the spacer 32 prevents the wear of the inner race 3 and the rear cover 11 and hence reduces the emergence of worn powder, however when a trace amount of worn powder is accumulated, it is inevitable that the worn powder intrudes into an internal area of the bearing, which leads to deterioration of the lubricant. Therefore, this method does not completely solve the problem.

With respect to the bearing unit shown in FIG. 7, though the elastic member 33 can prevent leakage of the worn powder out of the contact interface X between the inner race 3 and the rear cover 11, the original problem of the emergence of the worn powder and the accumulation thereof remain unsettled.

It could be an option to apply the spacer of FIG. 6 and the elastic member of FIG. 7 in combination to a bearing unit, however in this case an increase in the number of components as well as in the number of assembly steps is inevitable, and manufacturing process of the bearing unit becomes more complicated.

Accordingly, it is an object of the present invention to provide a bearing unit for a railway carriage wheel axle that suppresses emergence of the fretting worn powder, and inhibits intrusion of the worn powder into an internal area of the bearing, to thereby simplify the assembly process thereof.

SUMMARY OF THE INVENTION

For achieving the foregoing object, a first aspect of the present invention provides a bearing unit comprising a ring spacer interposed between and in contact with an end face of an inner race of a roller bearing to be mounted on a wheel axle and an end face of a ring member to be mounted on the same axle for axial positioning of the ring, wherein the ring spacer is provided with an elastic seal ring that makes contact with the opposing end faces of the inner race and the ring member via elastic deformation, integrally fixed to the ring spacer around an outer periphery thereof, at a generally central position in a direction of the elastic deformation.

The ring members to be butted to the end faces of the inner ring according to the present invention are the rear cover and the oil thrower, or the rear cover and the front cover (substituted for the oil thrower) as shown in FIG. 5, and the ring spacer is provided between the inner race and the rear cover, as well as between the inner race and the oil thrower or the front cover. Since the fretting worn powder is more prone to emerge between the inner race and the rear cover than between the inner race and the oil thrower or the front cover, it is also effective to interpose the ring spacer only between the inner race and the rear cover. Also, since the ring spacer is intended for keeping the inner race and the ring member from directly contacting thus to minimize the emergence of the fretting worn powder, it is preferable to employ a soft metal such as a brass thin plate. To the outer periphery of the ring spacer, an elastic seal such as a rubber ring is integrally fixed thus to assemble a ring spacer with an elastic seal ring as a single component, and such single component is placed between the inner race and the ring member. Disposing the elastic seal ring between the opposing end faces of the inner race and the ring member so as to be elastically pressed thereto achieves a liquid-tight and air-tight seal of the outer periphery of the contact interface between the end faces of the inner race and the ring member, respectively butted to a front and rear faces of the ring spacer. Here, designing the elastic seal ring such that a uniform pressure is applied thereto by the inner race and the ring member allows securing a sufficient margin for the elastic deformation of the elastic seal ring, and preventing hardening and permanent distortion of the elastic seal ring. The worn powder that has emerged and accumulated at the contact interface moves toward the elastic seal ring along the end faces of the ring spacer, but is blocked by the elastic seal ring upon reaching there, to be thereby completely inhibited from intruding into an internal area of the bearing beyond the elastic seal ring.

The bearing unit according to the present invention also includes a remedy for secular hardening (deterioration) of the elastic seal ring due to constant compression. In the case where the ring spacer 32a and the elastic seal ring 33a are combined in a simple form as shown in FIG. 8A, if the end face of the inner race 3 is a plane surface, a side of the elastic seal ring 33a integrally fixed to the ring spacer 32a is subjected to a pressure beyond an elastic limit thereof because of the plane surface, thus to be excessively depressed. As a result, a portion of the elastic seal ring 33a close to the bent section of the ring spacer 32a suffers premature secular hardening (deterioration). FIGS. 8B to 8D illustrate the progress of the deterioration (solid black area of FIGS. 8C, 8D) of the elastic seal ring 33a, from a new state of FIG. 8B. FIGS. 8B to 8D represent a state where the elastic seal ring 33a is removed from the bearing. Such deterioration of the elastic seal ring 33a results in emergence of a crack due to degradation in recovery performance, and organic substances deposit in the crack as a sludge to expand the crack, thus to finally destroy the elastic seal ring.

To prevent such problem, the elastic seal ring is integrally fixed to the ring spacer around an outer periphery thereof, at a generally central position in a direction of the elastic deformation, according to the present invention. Such configuration prevents the elastic seal ring from being excessively depressed beyond an elastic limit thereof, by the plane surface of the inner race (or the ring member). Accordingly, the secular deterioration of the elastic seal ring, and hence the breakdown thereof due to a crack and deposition of sludge can be prevented.

In the case where one of the end faces of the inner race and the ring member is a plane surface and the other is a stepped surface, the ring spacer may be fixed to the elastic seal ring with the outer periphery thereof bent so as to be separated from the plane surface.

Also, the end faces of the inner race and the ring member may be formed with a step, and both sides of the elastic seal ring may be formed so as to fit the stepped portions (a second aspect of the present invention). In this case, the ring spacer does not have to be bent.

Fitting the elastic seal ring of the ring spacer with the elastic seal ring to the stepped portion formed on the end face of the inner race and/or the ring member enhances the positional stability of the ring spacer during transportation or an assembly process to a wheel axle, which leads to higher assembly work efficiency and higher assembly quality. While it is effective to form such stepped portion on the end face of either the inner race or the ring member from the viewpoint of manufacturing process, the stepped portion may be provided on both of the inner race and the ring member for the elastic seal ring to be fitted.

According to the present invention, a storage space for the worn powder may be provided inside the elastic seal ring, to prevent the worn powder on the end faces of the inner race and the ring member from reaching the elastic seal ring. Such structure facilitates depositing the worn powder that has emerged on the end faces in the storage space, thereby reducing an amount of the worn powder that can reach the elastic seal ring.

According to the present invention, the elastic seal ring may be integrally fixed to an inner periphery of the ring spacer. In this case, the inner elastic seal ring is defined as a second elastic seal ring, for distinction from the elastic seal ring integrally fixed to the outer periphery of the ring spacer. The second elastic seal ring is elastically pressed against the end faces of the inner race and the ring member similarly to the elastic seal ring integrally fixed to the outer periphery of the ring spacer (hereinafter, "first elastic seal ring" as the case may be), so as to seal the contact interface between the inner race and the ring member both from outside and inside, to thereby further ensure prevention of leakage of the worn powder, in a radially outward and radially inward direction.

When employing the second elastic seal ring, it is preferable to form a second stepped portion on the end face of the inner race and/or the ring member to be in contact with the second elastic seal ring. Fitting both of the first elastic seal ring and the second elastic seal ring to the respective mating stepped portions of the inner race and the ring member enhances the positional stability during transportation or an assembly process to a wheel axle, which leads to higher assembly work efficiency.

According to the present invention, it is practically preferable that the ring spacer is constituted of a thin plate impregnated with a lubricant. Methods of impregnating a dissimilar thin plate include forming lubricant retaining grooves in a horizontal and vertical direction on a surface thereof, forming a multitude of minute dimples on a surface thereof, and forming a multitude of fine-diameter through holes from a front surface to a rear surface thereof. Impregnating the ring spacer itself constituted of a dissimilar plate with a lubricant improves lubricating performance between the inner race and the ring member thus also reducing wear of the ring spacer itself, which results in higher suppressing effect against the emergence of the fretting worn powder.

Preferably the roller bearing according to the present invention may be constituted of tapered rollers aligned in two rows, while cylindrical rollers may also be employed, according to a type of the railway carriage.

The bearing unit according to the present invention includes a ring spacer, which offers the advantage of suppressing emergence of fretting worn powder at a contact interface between an inner race of the bearing and a ring member such as a rear cover for delimiting a position of the inner race, and even though worn powder is produced from the spacer or other components an elastic seal ring integrally fixed to an outer periphery of the ring spacer inhibits intrusion of the worn powder into an internal area of the bearing, which results in a prolonged life span of the bearing unit, and hence to extension of a maintenance cycle for executing inspection and maintenance work of the bearing unit for a railway carriage wheel axle.

Forming a unified component by integrally fixing the elastic seal ring to the outer periphery of the ring spacer facilitates the handling and storage management of the materials for the spacer and the seal ring, which leads to reduction of the production cost. Also, since the elastic seal ring is integrally fixed to the ring spacer at a generally central position thereof in a direction of the elastic deformation, there is no likelihood that the elastic seal ring is excessively depressed when elastically deformed by contacting the end faces of the inner race and the ring member. Further, assembling the ring spacer with the elastic seal ring so as to fit a stepped portion formed on the end face of the inner race and/or the ring member improves the assembling efficiency of the ring spacer with the elastic seal ring and inhibits a position shift of the ring spacer with respect to the wheel axle, thereby achieving a simplified assembly process of a high-quality bearing unit.

Also, since a uniform pressure is applied to the elastic seal ring by the inner race and the ring member, a sufficient elastic deformation margin of the elastic seal ring can be secured, and hardening and permanent distortion of the elastic seal ring can be prevented.

Further, providing a worn powder storage space inside the elastic seal ring prevents direct adherence of sludge that may be formed from the worn powder and lubricant to the elastic seal ring, thereby preventing premature deterioration of the elastic seal ring because of an internal destruction.

DETAILED DESCRIPTION OF THE INVENTION

Figure 5:
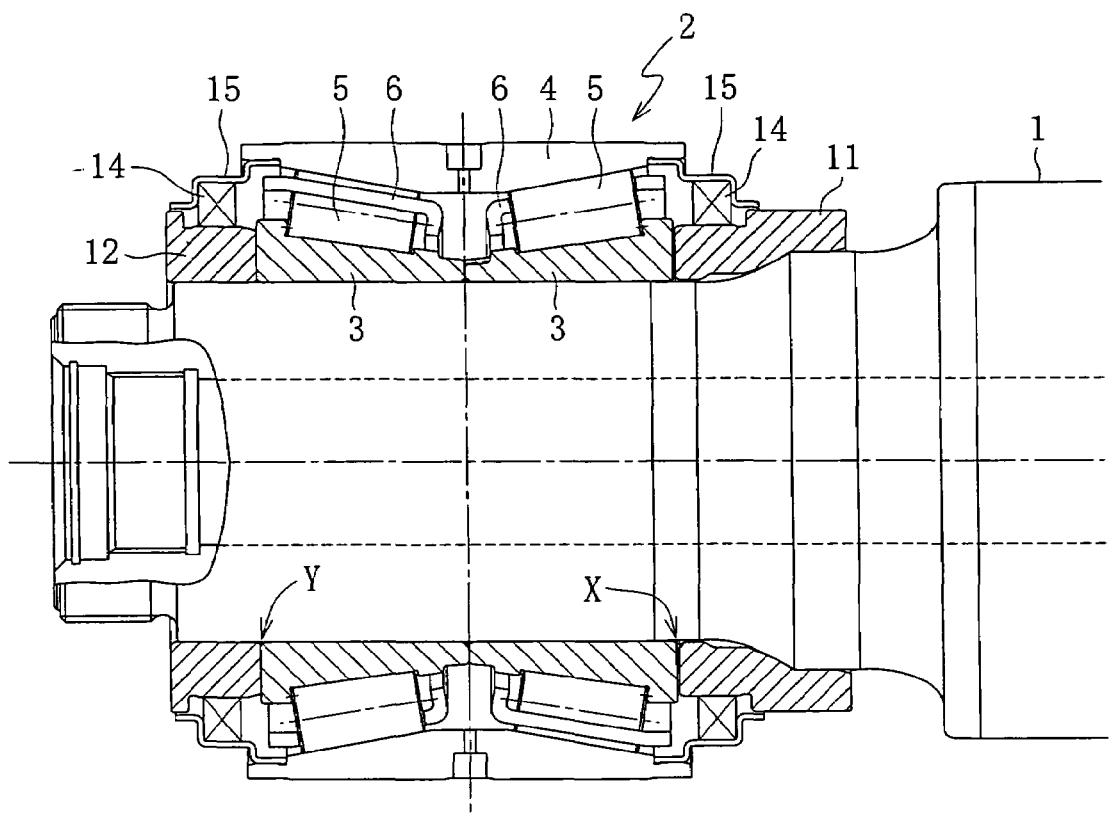
FIG. 5 is a cross-sectional view showing a structure of a conventional bearing unit for a railway carriage wheel axle.
Figure 6:
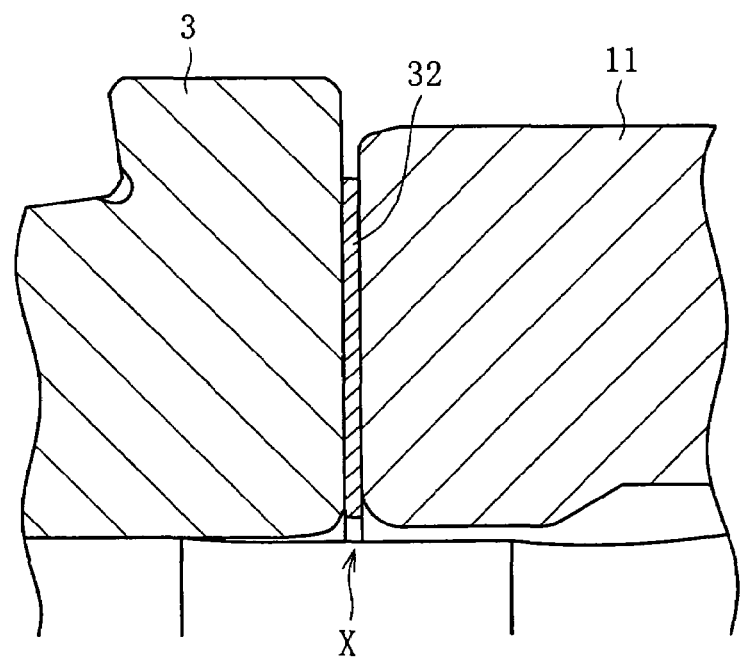
FIG. 6 is an enlarged fragmentary cross-sectional view of the bearing unit of FIG. 5.
Figure 7:
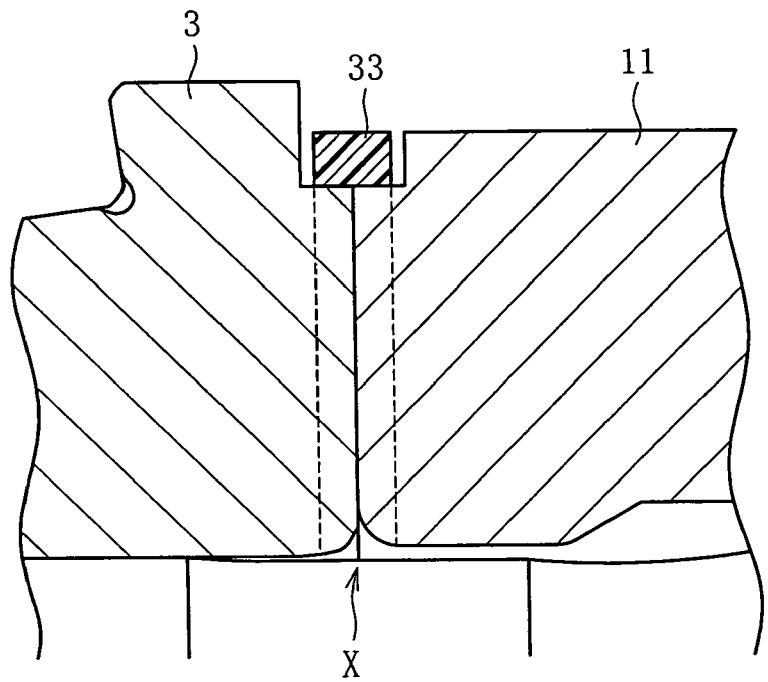
FIG. 7 is a fragmentary cross-sectional view of another conventional bearing unit.
Figure 8A:
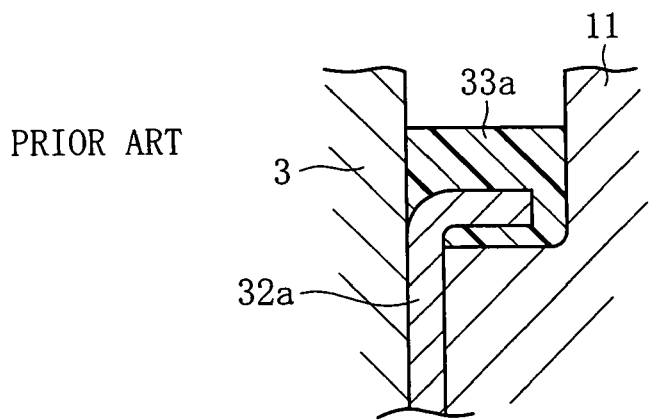
FIG. 8A is an enlarged fragmentary cross-sectional view of a ring spacer with an elastic seal ring.
Figure 8B:
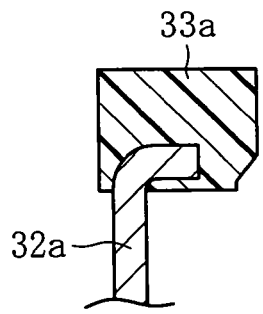
FIGS. 8B to 8D are cross-sectional views showing a progress of secular deterioration of the elastic seal ring.
Figure 8C:
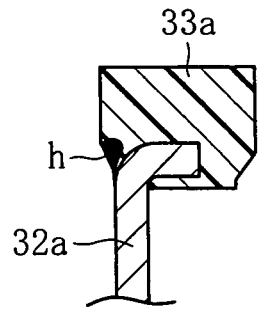
Figure 8D:
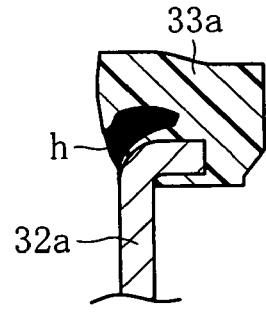

Referring to FIGS. 1A through 3B, a first embodiment of the present invention will be described hereunder. Since the bearing unit according to this embodiment has a similar basic structure to that of a bearing unit shown in FIG. 5, the same or equivalent constituents are given an identical numeral, and description thereof may be omitted where appropriate.

Figure 1A:
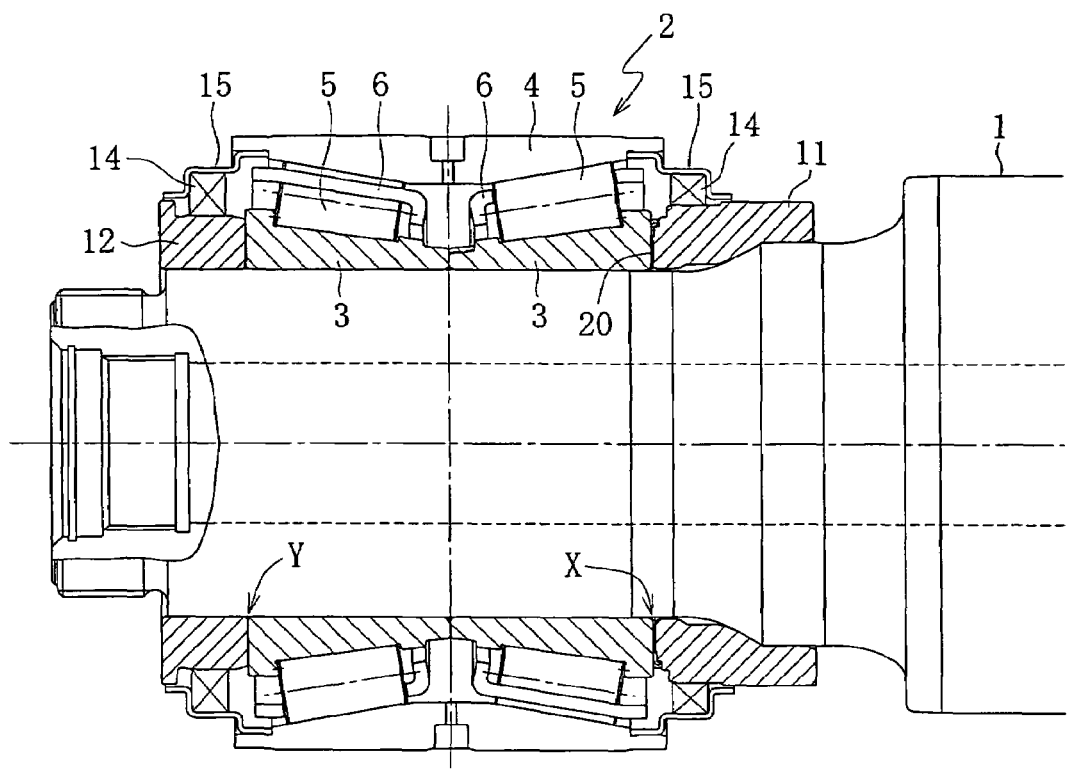
FIG. 1A is a cross-sectional view showing a bearing unit for a railway carriage wheel axle according to a first embodiment of the present invention.
Figure 1B:
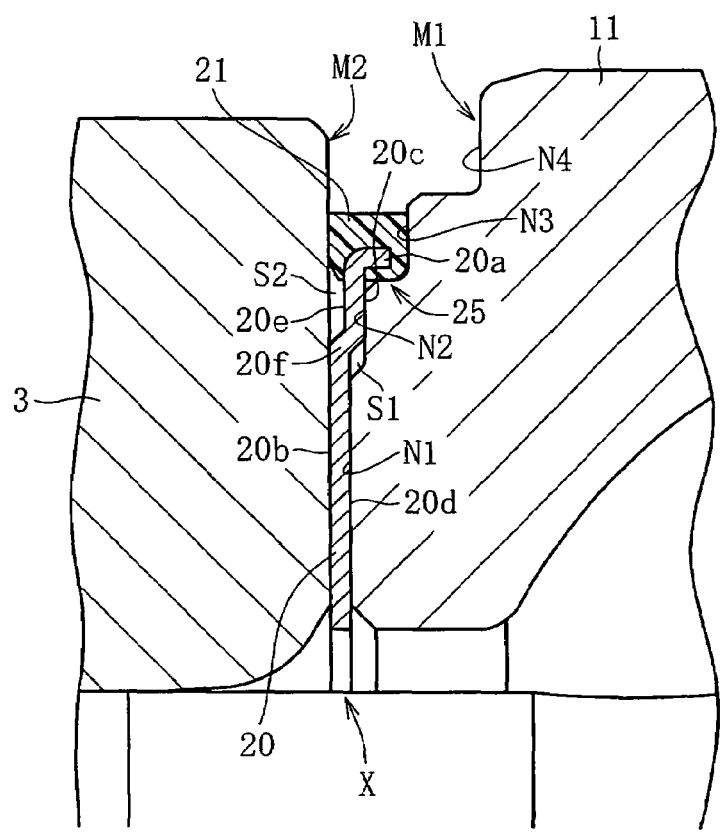
FIG. 1B is an enlarged fragmentary cross-sectional view of the bearing unit of FIG. 1A.

According to the first embodiment shown in FIGS. 1A and 1B, a ring spacer 20 with an elastic seal ring is interposed at a contact interface X between an inner race 3 and a rear cover (a ring member) 11, such that the rear end face of the inner race 3 and the front end face of the rear cover 11 is butted to the respective faces of the ring spacer 20. The ring spacer 20 with an elastic seal ring is a unified component built by integrally fixing an elastic seal ring 21 such as a rubber ring, to an outer periphery of the ring spacer 20 constituted of a ring-shaped brass thin plate, for example.

Figure 3A:
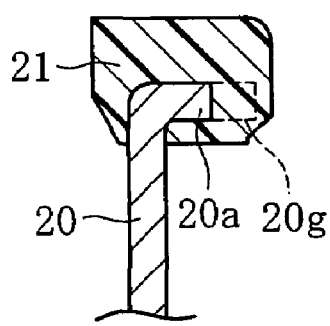
FIG. 3A is an enlarged fragmentary cross-sectional view showing a ring spacer with an elastic seal ring of FIG. 2.
Figure 3B:
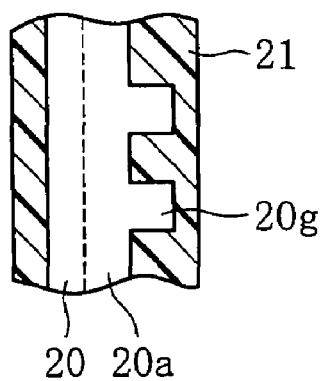
FIG. 3B is a partially cross-sectional fragmentary plan view of the ring spacer with an elastic seal ring of FIG. 3A.

The ring spacer 20 is formed by pressing a metal thin plate such as a brass plate, so as to include a rib portion 20a backwardly bent substantially at a right angle along an outer periphery of the spacer. The ring spacer 20 also includes two successive bent portions 20f bent in an obtuse angle, formed along an entire circumference near the rib portion 20a, so as to form stepped faces 20b, 20c, 20d and 20e. The elastic seal ring 21 is integrally fixed to the ring spacer 20 so as to cover an entirety of the rib portion 20a. A position of such fixation is substantially at a center of the elastic seal ring 21 in a direction of the elastic deformation thereof, i.e. along an axial line of the bearing unit. A reason of fixing the elastic seal ring 21 substantially at the center thereof is to realize a substantially uniform compression ratio at the respective sides of the ring spacer 20. Accordingly, a projecting length of the rib portion 20a also has to be taken into account when determining a fixing position of the elastic seal ring 21. For example, in the case where the rib portion 20a is to be extended further to the right in FIG. 1B, the ring spacer 20 is relatively shifted to the left. The elastic seal ring 21 is constituted of an abrasion-resistant elastic material such as a nitrile rubber, and formed in a ring shape that covers an outer and inner faces of the rib portion 20a of the ring spacer 20, so as to be fitted thereto. An edge portion of the rib portion 20a includes a plurality of integrally formed projections 20g as shown in FIGS. 3A and 3B, so that the elastic seal ring 21 is squeezed into between the adjacent projections 20g, to thereby enhance the fixing strength of the elastic seal ring 21 to the ring spacer 20.

Figure 2:
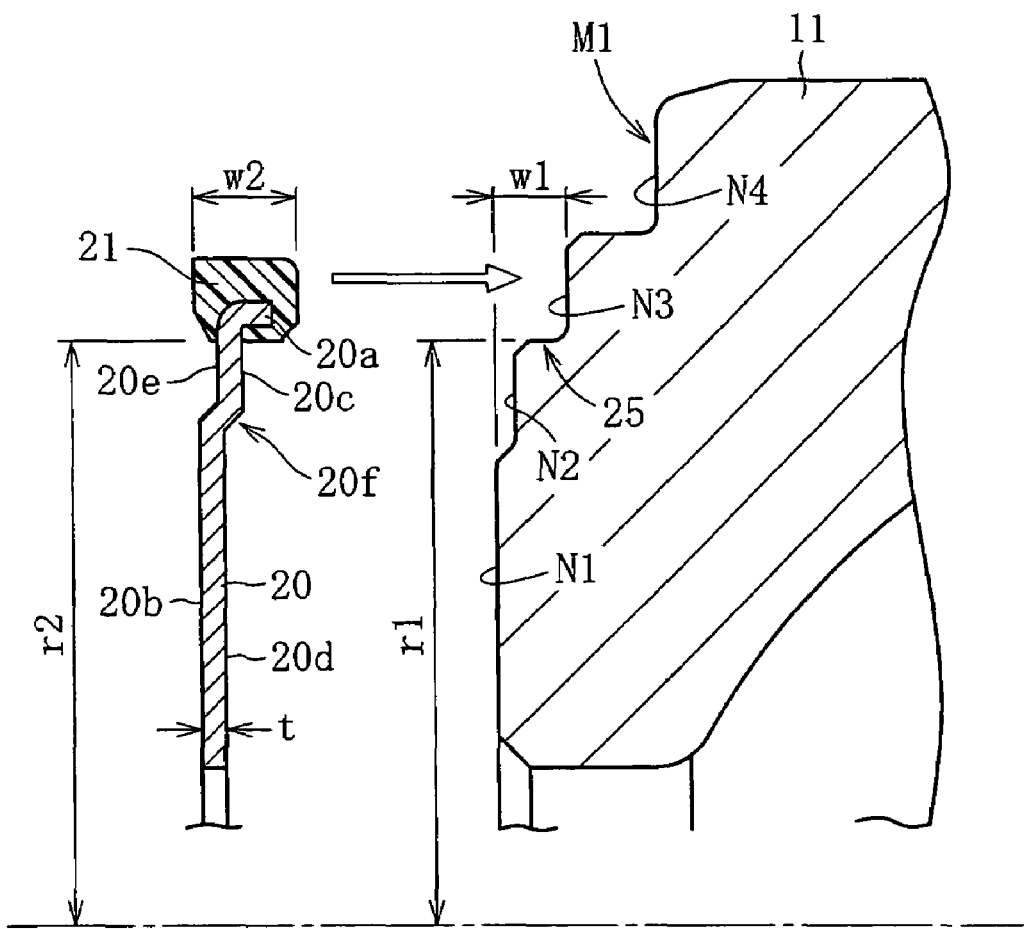
FIG. 2 is an exploded cross-section view of the bearing unit of FIG. 1A.

FIG. 1B depicts the front end face M1 of the rear cover 11 and the rear end face M2 of the inner race 3. The end face M2 of the inner race 3 is an annular plane surface. The end face M1 of the rear cover 11 includes an annular inner plane surface N1, middle plane surfaces N2, N3, and an outer plane surface N4 sequentially stepped backward. A stepped portion 25 is formed between the middle plane surfaces N2 and N3. The stepped portion 25 is a section recessed substantially at a right angle from an outer circumference of the inner middle plane surface N2, and from the end of the recessed section the outer middle plane surface N3 is extending. As shown in FIG. 2, a radius r1 of the outer circumference of the stepped portion 25 is set to be slightly greater than a radius r2 of the elastic seal ring 21 included in the ring spacer 20 with the elastic seal ring in an ordinary state not subjected to elastic deformation (r1>r2). Also, a width W2 of the elastic seal ring 21 in an ordinary state not subjected to elastic deformation is set to be slightly wider than a total of the height W1 of the stepped portion 25 and a thickness t of the ring spacer 20 (W2>W1+t).

The ring spacer 20 with the elastic seal ring, built by integrally fixing the elastic seal ring 21 to the outer periphery thereof, is press-fitted to the outer circumference of the stepped portion 25 protruding on the face M1 of the rear cover 11, thus to be integrally assembled. The annular elastic seal ring 21 is subjected to elastic deformation so as to be elastically fitted to the outer circumference of the stepped portion 25 and the outer middle plane surface N3. This elastic fitting of the elastic seal ring 21 to the stepped portion 25 stabilizes the relative positioning between the rear cover 11 and the ring spacer 20, so that the ring spacer 20 is prevented from shifting its position or falling off. The steps of insert-fitting the rear cover 11 to the wheel axle 1 and mounting the bearing 2 to the wheel axle 1 improves the assembly efficiency of the bearing unit and stabilizes the assembly precision at a higher level, without the fear of position shift and separation of the ring spacer 20.

On the part of the ring spacer 20, the stepped faces 20b, 20c are butted to the front face M1 of the inner race 3 and the middle plane surface N2 of the rear cover 11, respectively. Between a portion on the outer circumference side of the stepped face 20d and the middle plane surface N2 of the rear cover 11, a first storage space S1 is provided for the worn powder. Also a second storage space S2 is provided between the stepped face 20e and the front face M1 of the inner race 3. Bringing the stepped face 20c and the middle plane surface N2 of the rear cover 11 into mutual contact allows alleviating a load applied to the elastic seal ring 21 when the wheel axle 1 is bent. Also, a time for the worn powder to reach the elastic seal ring 21 can be prolonged. Here, it is not imperative to make the stepped face 20c and the middle plane surface N2 of the rear cover 11 contact with each other. In case of need, the second storage space S2 for the worn powder may be expanded to an area between the stepped face 20c and the middle plane surface N2 of the rear cover 11.

Still referring to FIG. 1B, upon completing the assembly of the bearing unit, the ring spacer 20 is butted to the inner plane surface N1 of the rear cover 11 and the end face M2 of the inner race 3, thus to keep the inner race 3 and the rear cover 11 from directly contacting with each other, and to thereby securely suppress emergence of the fretting worn powder. At the same time the elastic seal ring 21 is pressed against the outer periphery of the stepped portion 25 of the rear cover 11 and the middle plane surface N3, as well as against the end face M2 of the inner race 3, thus to liquid-tightly and air-tightly seal the outer periphery of the contact interface X between the inner race 3 and the rear cover 11. Accordingly, even though worn powder emerges out of the ring spacer at the contact interface X, the worn powder is inhibited from leaking out of the contact interface by the elastic seal ring 21. Therefore, intrusion of the worn powder into an internal area of the bearing 2 is securely inhibited, and a life span of the bearing 2 can be prolonged.

Further, in the bearing unit shown in FIG. 1A, when the wheel axle 1 is bent by a load imposed thereon, the open space defined by the middle plane surfaces N2, N3 stepped backward toward the outer circumference of the end face M1 of the rear cover 11 serves as a relief to absorb the flexure, and such relief space further reduces emergence of the fretting worn powder.

Figure 4:
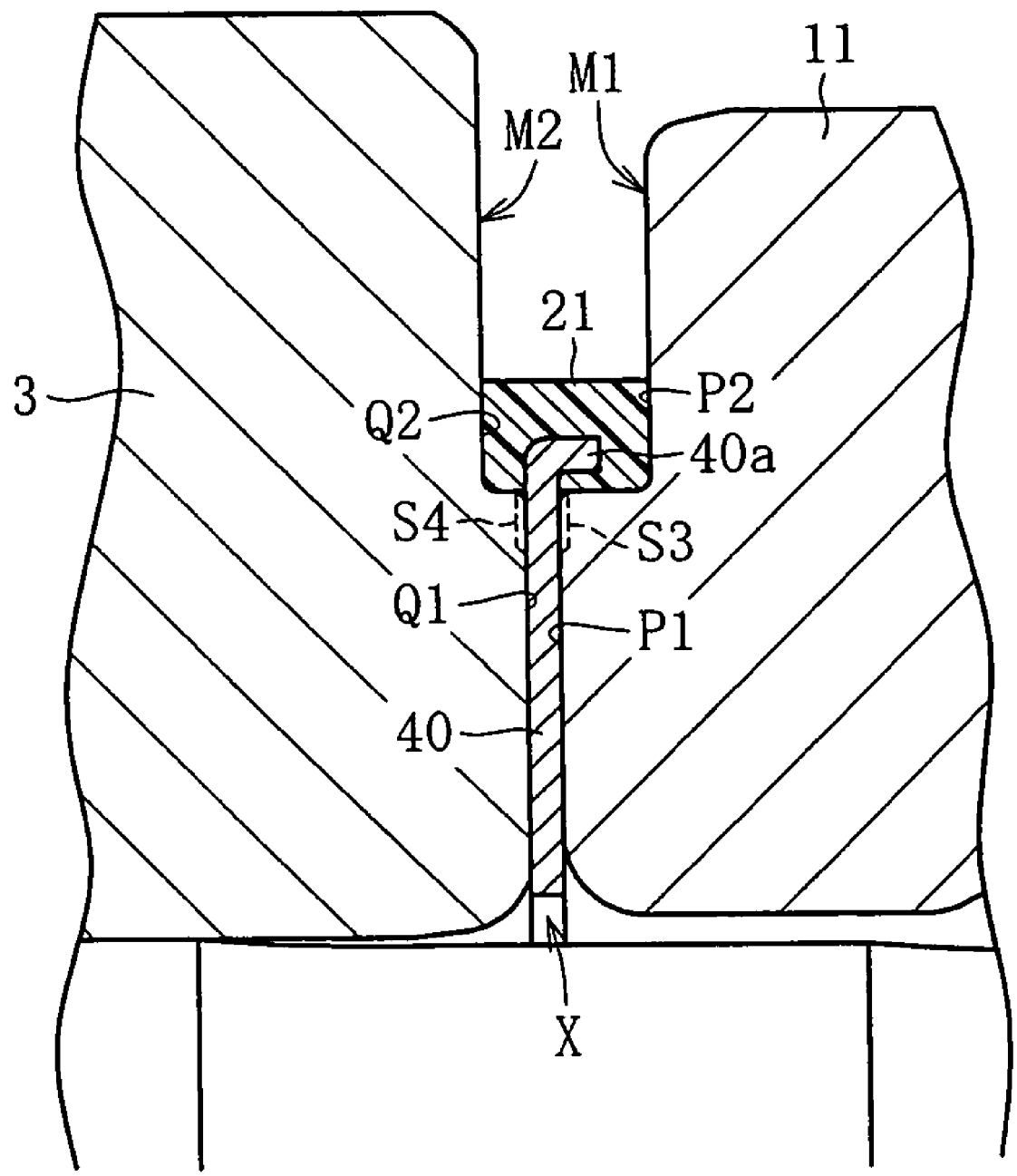
FIG. 4 is an enlarged cross-sectional view of a bearing unit according to a modified embodiment of the present invention.

FIG. 4 depicts a modified embodiment of the present invention. According to this modification, stepped portions P2, Q2 are formed on the front end face M1 of the rear cover 11 and the rear end face M2 of the inner race 3 respectively, so that a ring spacer 40 is held between plane surfaces P1, Q1 of the front end face M1 and the rear end face M2. The edge portion of the ring spacer 40 is bent by a right angle toward either of the stepped portions P2 or Q2 thus to form a rib portion 40a, and the elastic seal ring 21 is integrally fixed to the rib portion 40a. Axial faces of the elastic seal ring 21 are fitted in a compressed contact manner to the stepped portions P2, Q2 along their entire lengths.

Under such structure, the elastic seal ring 21 can be kept from being subjected to an excessive pressure, and hence from premature deterioration. The plane surfaces P1, Q1 may be recessed at a position near the elastic seal ring 21 to form a storage space S3, S4 like the storage spaces S1, S2. Since the storage space S3, S4 reduces an amount of the worn powder that can reach the elastic seal ring 21, reliability of the elastic seal ring 21 is further upgraded.

What is claimed is:

1. A bearing unit for a railway carriage, comprising:
a ring spacer interposed between and in contact with an end face of an inner race of a roller bearing to be mounted on a wheel axle and an end face of a ring member to be mounted on the same axle for axial positioning of the ring,
wherein the ring spacer is provided with an elastic seal ring that makes contact with the opposing end faces of the inner race and the ring member via elastic deformation, integrally fixed to the ring spacer around an outer periphery thereof, at a generally central position in a direction of the elastic deformation, wherein one of the end faces is a plane surface and the other is a stepped surface, and the ring spacer is integrally fixed to the elastic seal ring with the outer periphery thereof bent toward the stepped portion so as to be separated from the plane surface, and one side of the elastic seal ring is fitted to the stepped portion.

2. The bearing unit for a railway carriage according to claim 1, wherein the roller bearing is a double-race tapered roller bearing.

3. The bearing unit for a railway carriage according to claim 1, wherein a storage space for worn powder emerged on the end face of the inner race and the ring member is provided inside the elastic seal ring.

4. The bearing unit for a railway carriage according to claim 3, wherein the roller bearing is a double-race tapered roller bearing.

5. A bearing unit for a railway carriage, comprising:
a ring spacer interposed between and in contact with an end face of an inner race of a roller bearing mounted on a wheel axle and an end face of an axle ring member mounted on the same axle,
wherein the ring spacer is provided with a single elastic seal ring having an unrestrained circumferential face and axial faces making contact with the opposing end faces of the inner race and the ring member via elastic deformation and an unrestrained circumferential face, integrally fixed to the ring spacer around an outer periphery thereof, at a generally central position in a direction of the elastic deformation,
wherein said end face of said inner race and said end face of said axle ring member each have a stepped portion, each stepped portion having an end face, and an entire length of both axial faces of the elastic seal ring being in compressed contact with the end faces of the stepped portions of the end faces of the inner race and the axle ring member.

6. The bearing unit for a railway carriage according to claim 5, wherein the roller bearing is a double-race tapered roller bearing.

7. The bearing unit for a railway carriage according to claim 5, wherein a storage space for worn powder emerged on the end face of the inner race and the ring member is provided inside the elastic seal ring.

8. The bearing unit for a railway carriage according to claim 7, wherein the roller bearing is a double-race tapered roller bearing.

* * * * *